United States Patent
Okazaki et al.

(10) Patent No.: US 8,101,029 B2
(45) Date of Patent: Jan. 24, 2012

(54) WELD METAL OF HIGH-STRENGTH CR-MO STEEL

(75) Inventors: Yoshitomi Okazaki, Kobe (JP); Ken Yamashita, Fujisawa (JP); Hirohisa Watanabe, Fujisawa (JP); Koichi Hosoi, Fujisawa (JP)

(73) Assignee: Kobe Steel, Ltd., Kobe-Shi (JP)

( * ) Notice: Subject to any disclaimer, the term of this patent is extended or adjusted under 35 U.S.C. 154(b) by 437 days.

(21) Appl. No.: 12/024,439

(22) Filed: Feb. 1, 2008

(65) Prior Publication Data
US 2008/0199346 A1   Aug. 21, 2008

(30) Foreign Application Priority Data

Feb. 19, 2007 (JP) ................. 2007-037269
Oct. 19, 2007 (JP) ................. 2007-272201

(51) Int. Cl.
*C22C 38/44* (2006.01)
*C22C 38/46* (2006.01)
*C22C 38/48* (2006.01)
*C22C 38/54* (2006.01)

(52) U.S. Cl. ........ 148/335; 420/110; 420/111; 420/106; 420/109; 219/137 WM

(58) Field of Classification Search ............. 148/334, 148/335; 420/110, 111, 106, 109; 219/137 WM
See application file for complete search history.

(56) References Cited

U.S. PATENT DOCUMENTS
2005/0257853 A1   11/2005  Yamashita et al.
2006/0179974 A1   8/2006   Hatano et al.
2007/0253857 A1   11/2007  Okazaki et al.

FOREIGN PATENT DOCUMENTS
| CN | 1821432 A | 8/2006 |
|---|---|---|
| EP | 1 693 143 A1 | 8/2006 |
| JP | 1-271096 | 10/1989 |
| JP | 7-100688 | 4/1995 |
| JP | 9-192881 | 7/1997 |
| JP | 10-137975 | 5/1998 |

OTHER PUBLICATIONS

P. N. Spencer, et al., "Fracture toughness, fatigue crack propagation and creep rupture behaviour in thick section weldments of 3Cr-Mo Pressure-vessel steels developed for high-temperature/high-pressure hydrogen service", High Temperature Technology, vol. 7, No. 1, XP-000005241, Feb. 1, 1989, pp. 17-26.

*Primary Examiner* — Deborah Yee
(74) *Attorney, Agent, or Firm* — Oblon, Spivak, McClelland, Maier & Neustadt, L.L.P.

(57) ABSTRACT

A weld metal of a high-strength Cr—Mo steel formed by shielded metal arc welding contains: 0.04 to 0.10% by mass C, 0.15 to 0.5% by mass Si, 0.5 to 1.0% by mass Mn, 2.00 to 3.25% by mass Cr, 0.9 to 1.2% by mass Mo, 0.01 to 0.03% by mass Nb, 0.2 to 0.7% by mass V, 0.003% by mass or below and above 0% by mass B, 0.02 to 0.05% by mass O, and the balance of Fe and inevitable impurities. A residual extracted by electrolytic extraction from only an unaffected zone of the weld metal contains precipitated Cr in a Cr content below 0.3% by mass, and precipitated Nb in a Nb content of 0.005% by mass or above.

9 Claims, 3 Drawing Sheets

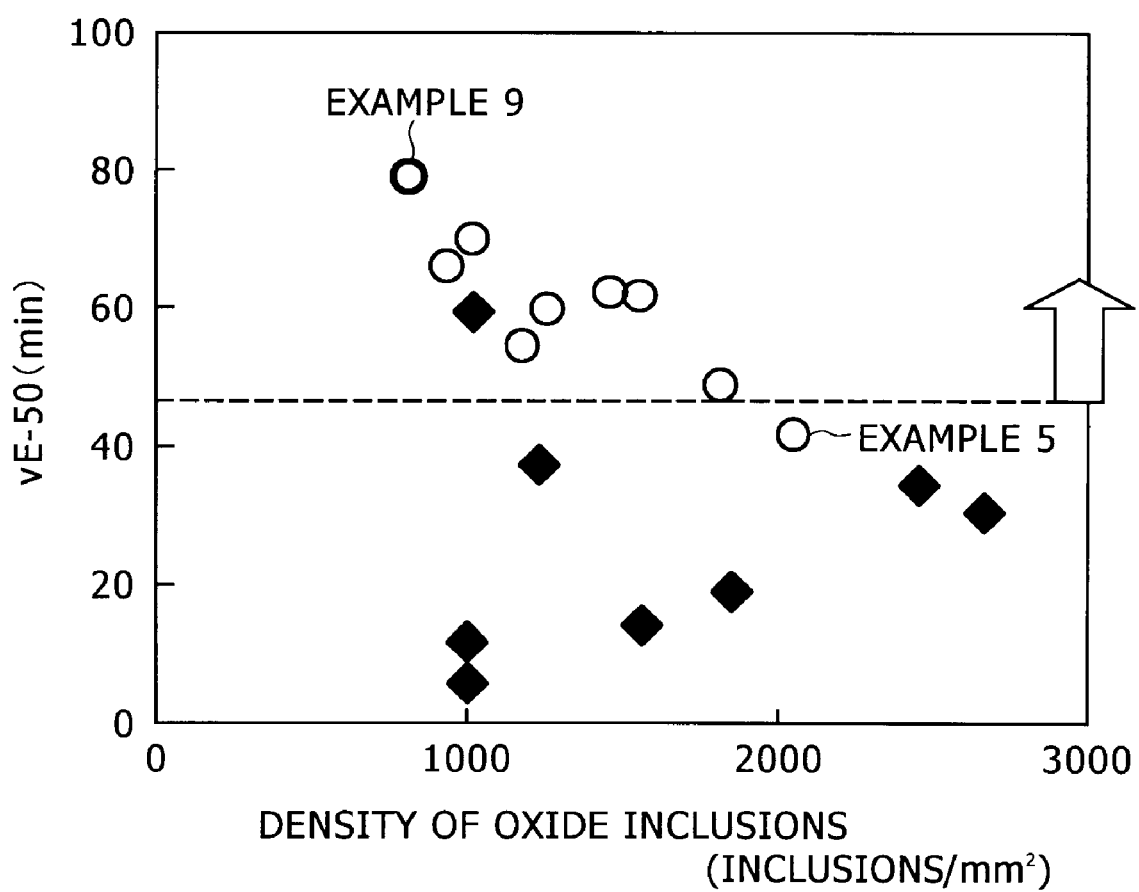

WELD METAL OF HIGH-STRENGTH CR-MO STEEL

BACKGROUND OF THE INVENTION

1. Field of the Invention

The present invention relates to a weld metal of high-strength Cr—Mo steel formed by welding using a covered electrode.

2. Description of the Related Art

Large heat-resistant containers of Cr—Mo low alloy steel intended for use in high-temperature, high-pressure environment, such as environment in power plants and chemical plants, have thick walls. Those containers are made of high-strength Cr—Mo steel containing V, Nb and such. Steel materials of high-strength Cr—Mo steel are cut in desired shapes. The shaped high-strength Cr—Mo steel materials are welded together to build a large container.

Generally, those high-strength Cr—Mo steel materials are welded by efficient submerged arc welding. Shielded metal arc welding is needed for welding nozzles and pipes. Improvement of the heat resistance (high-temperature strength), stress relief (SR) cracking resistance (resistance to intercrystalline cracking during annealing for stress relieving), toughness, and temper embrittlement resistance of a weld metal in a weld zone is desired. Various techniques for the improvement of toughness and temper embrittlement resistance have been proposed. A technique relating to a TIG welding wire is disclosed in Jpn. Pat. No. 2742201. This technique intend to improve temper embrittlement resistance by limiting a parameter represented by (Si+Mn)/C (P+Sn+Sb+As) to a fixed value. A technique relating to weld metal and covered welding materials is disclosed in Jpn. Pat. No. 3283773. This technique improves SR cracking resistance by suppressing the precipitation of cementite in prior austenite grain boundaries through the control of the composition of a residual obtained by electrolytic extraction such that the residual contains 35 wt. % or below Fe and 10 wt. % or above V. A technique relating to the improvement of temper embrittlement resistance is mentioned in JP-A H1-271096. This technique improves temper embrittlement resistance by reducing the oxygen content of a weld metal produced by submerged arc welding.

The efficiency of TIG welding work is low. Highly efficient welding methods, such as shielded metal arc welding methods, gas shielded arc welding methods and submerged arc welding methods, are desirable for welding recent large structures having a big wall thickness. The oxygen content of a weld metal produced by welding methods other than the TIG welding method is inevitably high. Therefore, the composition mentioned in Jpn. Pat. No. 2742201 needs to be examined. Although all the characteristics of the weld metal formed by shielded metal arc welding mentioned in Jpn. Pat. No. 3283773 are well balanced, the temper embrittlement resistance of this weld metal needs improvement. The effect of the submerged arc welding method mentioned in JP-A H1-271096 on the improvement of temper embrittlement resistance is not satisfactory.

SUMMARY OF THE INVENTION

Accordingly, it is an object of the present invention to provide a weld metal of high-strength Cr—Mo steel capable of meeting the requirements of improvement in toughness and temper embrittlement resistance of weld metals in heat-resistant vessels of Cr—Mo low alloy steel for use in a high-temperature, high-pressure environment, such as an environment in recent power plants and chemical plants, and excellent in the balance of heat resistance (high-temperature strength), SR cracking resistance, toughness, and temper embrittlement resistance.

The inventors of the present invention made studies of the temper embrittlement resistance of high-strength Cr—Mo steel in shielded metal arc welding through an embrittlement promotion process (step cooling process). It was found through the studies that many weld metals were embrittled even if the impurity content of the weld metals was reduced. It was found through the study of such embrittlement that carbide forms dominate the temper embrittlement resistance of weld metals. More concretely, the temper embrittlement resistance was successfully improved by promoting the growth of MC carbides containing Nb as a principal component and suppressing the formation of carbides containing Cr as a principal component during the embrittlement promotion process (step cooling process). It was found that the control of carbide forms is effective also in improving other characteristics, such as SR cracking resistance and toughness.

It was found that the carbide forms can be realized in the weld metal by properly controlling the components including C, Cr, Mo, Nb and V of a welding rod for shielded metal arc welding and welding conditions, and the present invention has been made on the basis of those findings.

Dominant factors other than carbide form were examined to improve temper embrittlement resistance and it was found that a desired temper embrittlement resistance can be stabilized by limiting the number density, namely, the number of inclusions in a unit area, of comparatively coarse oxide inclusions of diameters not smaller than 1 μm to a value below two thousand. It was found also that the number density of coarse oxide inclusions can be controlled through the control of the deoxidizing element content of the weld metal in addition to the oxygen content of the weld metal.

A weld metal of a high-strength Cr—Mo steel in one aspect of the present invention formed by shielded metal arc welding contains: 0.04 to 0.10% by mass C, 0.15 to 0.5% by mass Si, 0.5 to 1.0% by mass Mn, 2.00 to 3.25% by mass Cr, 0.9 to 1.2% by mass Mo, 0.01 to 0.03% by mass Nb, 0.2 to 0.7% by mass V, 0.003% by mass or below and above 0% by mass B, 0.02 to 0.05% by mass O, and the balance of Fe and inevitable impurities; wherein a residual extracted by electrolytic extraction from only an unaffected zone of the weld metal contains precipitated Cr in a Cr content below 0.3% by mass, and Nb in a Nb content of 0.005% by mass or above.

The toughness and the temper embrittlement resistance of the weld metal can be improved by regulating the C, Si, Mn, Cr, Mo, Nb, V, B and O contents, namely, the essential element contents, of the weld metal of the high-strength Cr—Mo steel so as to be in specified content ranges, respectively, regulating the quantities of precipitated Cr and Nb contained in the residual obtained by electrolytic extraction so as to be in specified ranges, respectively, promoting the growth of a MC carbide containing Nb as a principal component during an embrittlement promotion process (step cleaning process), suppressing the formation of a carbide containing Cr as a principal component, and controlling the formation of carbides dominating the temper embrittlement resistance of the weld metal.

In the weld metal of a high-strength Cr—Mo steel according to the aspect, the inevitable impurities may include Cu and Ni in a Cu content below 0.05% by mass and a Ni content below 0.05% by mass, respectively, to improve the temper embrittlement resistance of the weld metal.

In the weld metal of a high-strength Cr—Mo steel according to the aspect, the temper embrittlement resistance can be improved by limiting the S and the P content of the inevitable impurities that segregate in old γ grain boundaries and promote temper embrittlement, contained in the weld metal to a P and a S content below 0.012% by mass.

The weld metal of a high-strength Cr—Mo steel according to the aspect may have a parameter CP of 5 to 50 expressed by:

$$CP=[C]\times[Nb]/([Cr]/52+[Mo]/96+[Nb]/93+[V]/51)\times 1000 \qquad (1)$$

where [C], [Nb], [Cr], [Mo] and [V] are the C, the Nb, the Cr, the Mo and the V content in percentage by mass of the weld metal.

When the high-strength Cr—Mo steel has the parameter CP in the range of 5 to 60, the temper embrittlement resistance can be improved by promoting the growth of a MC carbide containing Nb as a principal component and suppressing the growth of a carbide containing Cr as a principal component during the embrittlement promotion process (step cooling process).

In the weld metal of a high-strength Cr—Mo steel according to the aspect, the number of oxide inclusions of 1 μm or above in size in an observation area of 1 mm² may be below 2000.

Fracture starting points can be reduced to improve the temper embrittlement resistance of the weld metal and the weld metal of a high-strength Cr—Mo steel has a desired stable temper embrittlement resistance when the number density of oxide inclusions of 1 μm or above in size in an observation area is below 2000/mm².

When the weld metal of a high-strength Cr—Mo steel having stable temper embrittlement resistance and processed by a step cooling process is subjected to a Charpy impact test, even the minimum vE-50 is 55 J or above.

The weld metal of a high-strength Cr—Mo steel according to the aspect has a Si content [Si], a Mn content [Mn] and an O content [O] meeting a condition expressed by:

$$12000[Si]+170[Mn]+150000[O]<9800 \qquad (2)$$

The temper embrittlement resistance can be improved and the weld meal having desired stable temper embrittlement resistance can be formed by controlling deoxidizing element content in addition to the oxygen content of the weld metal and properly balancing the Si, the Mn and the O content when the weld metal of a high-strength Cr—Mo steel has the Si content [Si], the Mn content [Mn] and the O content [O] meeting a condition expressed by Expression (2).

The toughness and the temper embrittlement resistance of the weld metal of a high-strength Cr—Mo steel according to the aspect are improved by controlling the formation of carbides dominating the temper embrittlement resistance of the weld metal through the promotion of the growth of the MC carbide containing Nb as a principal component, and the suppression of the growth of the carbide containing Cr as a principal component. Thus the present invention can meet demand for the improvement of the toughness and temper embrittlement resistance of weld metals in heat-resistant vessels of Cr—Mo low alloys intended for use in a high-temperature, high pressure environment, such as environment in power plants and chemical plants.

BRIEF DESCRIPTION OF THE DRAWINGS

The above and other objects, features and advantages of the present invention will become more apparent from the following description taken in connection with the accompanying drawings, in which:

FIG. 5 is a graph showing the dependence of vE-50 on oxide inclusions density for weld metals in examples of the present invention and those in comparative examples.

DESCRIPTION OF THE PREFERRED EMBODIMENTS

Figure 1:
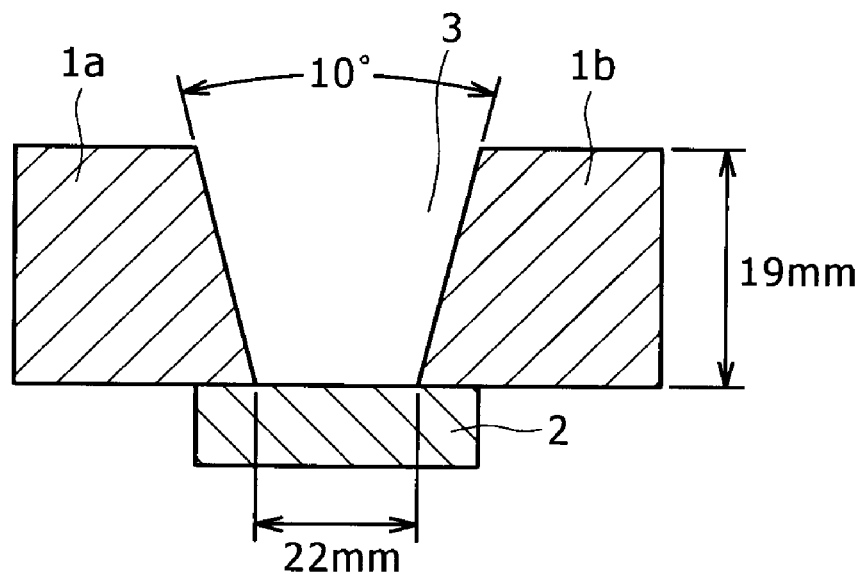
FIG. 1 is a typical sectional view of base metal plates finished by edge preparation, and a backing strip for making a specimen.

A weld metal of a high-strength Cr—Mo steel in a preferred embodiment according to the present invention (hereinafter, referred to simply as "weld metal of the present invention") will be described.

A weld metal of the present invention is formed in a weld zone in a base material of a high-strength Cr—Mo steel by shielded metal arc welding. The weld metal contains C, Si, Mn, Cr, Mo, Nb, V, B and O as essential components respectively in predetermined contents, and the balance of Fe and inevitable impurities. Numerical ranges of the essential component contents of the weld metal of the present invention and reasons for setting limits to the ranges will be described.

C Content of the Weld Metal

Carbon (C) has significant influence on the hardenability of the weld metal and is an important element for ensuring strength at room and high temperatures, and toughness. When the C content is excessively high, the amount of carbides containing Cr as a principal component increases and the embrittlement resistance deteriorates. A desired C content of the weld metal is between 0.04 and 0.10% by mass. When the C content is below 0.04% by mass, the strength and toughness of the weld metal are low. A C content above 0.10% by mass deteriorates temper embrittlement resistance. Preferably the C content of the weld metal be between 0.05 and 0.08% by mass.

Si Content of the Weld Metal

Silicon (Si) remaining in the weld metal after cleaning the weld metal strengthens a ferrite solid solution and improves the conformability of weld beads. A desired Si content of the weld metal is between 0.15 and 0.5% by mass. When the Si content of the weld metal exceeds 0.5% by mass, the strength of the weld metal increases, the toughness of the weld metal diminishes, and the temper embrittlement resistance of the weld metal lowers. When the Si content is below 0.15% by mass, the conformability of weld beads is unsatisfactory and the facility of welding work is unsatisfactory. A preferable Si content is between 0.2 and 0.4% by mass.

Mn Content of the Weld Metal

Manganese (Mn) improves the toughness of the weld metal and is particularly effective in improving the toughness of a weld metal containing V. Manganese is an important element that provides the weld metal with toughness before step cooling. A desired Mn content of the weld metal is between 0.5 and 1.0% by mass. The temper embrittlement resistance of the weld metal lowers when the Mn content exceeds 1.0% by mass. The toughness of the weld metal is insufficient when the Mn content of the weld metal is below 0.5% by mass. A preferable Mn content is between 0.6 and 0.9% by mass.

Cr Content of the Weld Metal

Chromium (Cr) is a principal component of a high-strength Cr—Mo steel excellent in heat resistance and is important for providing the weld metal with strength. A desired Cr content of the weld metal is between 2.00 and 3.25% by mass. Hardenability increases, toughness lowers, coarse carbides are formed in grain boundaries and temper embrittlement resistance deteriorates when the Cr content exceeds 3.25% by mass. The weld metal cannot have a desired strength if the Cr content is below 2.00% by mass. A preferable Cr content is between 2.1 and 3.0% by mass.

Mo Content of the Weld Metal

Molybdenum (Mo), as well as Cr, is a principal component of a high-strength Cr—Mo steel excellent in heat resistance and is an important element that provides the weld metal with mechanical strength. A desirable Mo content of the weld metal is between 0.9 and 1.2% by mass. Hardenability increases and toughness lowers when the Mo content exceeds 1.2% by mass. The weld metal cannot have a desired strength when the Mo content is below 0.9% by mass. A preferable Mo content is between 1.0 and 1.1% by mass.

Nb Content of the Weld Metal

Niobium (Nb) is effective in improving strength at room and high temperatures, and creep strength even if the Nb content is very low. A desired Nb content is between 0.01 and 0.03% by mass. Strength increases excessively and toughness lowers when the Nb content exceeds 0.03% by mass. Niobium does not have effect on improving strength and creep strength at room and high temperatures when the Nb content is below 0.01% by mass. A preferable Nb content is between 0.015 and 0.025% by mass.

V Content of the Weld Metal

Vanadium (V) makes fine MC carbides precipitate preferentially in grains of the weld metal after a SR process and improves the toughness and temper embrittlement resistance of the weld metal. Vanadium (V) has an effect on enhancing the strength of the weld metal at room and high temperatures and the creep strength of the weld metal. A desired Nb content of the weld metal is between 0.2 and 0.7% by mass. Strength increases excessively and toughness and tempera embrittlement resistance lower when the V content of the weld metal exceeds 0.7% by mass. The toughness and temper embrittlement resistance improving effect of V is insufficient when the V content of the weld metal is below 0.2% by mass. A preferable V content is between 0.3 and 0.6% by mass.

B Content of the Weld Metal

Boron (B) is effective in ensuring the weld metal toughness. Amount of carbides containing Cr as a principal component is reduced when the weld metal has a proper B content. A desired B content of the weld metal is 0.003% by mass or below and above 0% by mass. Nitrogen (N) contained in the weld metal is fixated when the B content of the weld metal exceeds 0.003% by mass. Consequently, fine MC carbides increase. A preferable B content is 0.002% by mass or below and above 0% by mass.

O Content of the Weld Metal

Oxygen (O) is effective in forming the weld metal in a fine structure and ensuring the weld metal toughness. Oxygen (O) contained in the weld metal is effective in improving SR cracking resistance through the reduction of the grain size of prior austenite grains. A desired O content of the weld metal is between 0.02 and 0.05% by mass. Oxide inclusions increase and toughness lowers when the oxygen content exceeds 0.05% by mass. Toughness cannot be improved when the oxygen content of the weld metal is below 0.02% by mass. A preferable oxygen content is between 0.03 and 0.04% by mass.

The weld metal of the present invention contains C, Si, Mn, Cr, Mo, Nb, V, B and O as essential components, and the balance of Fe and inevitable impurities. Although Cu and Ni included in the inevitable impurities are effective in ensuring the weld metal toughness, Cu and Ni promote temper embrittlement. It is desirable to limit the Cu and the Ni content of the weld metal of the present invention to values below 0.05% by mass, more desirably, below 0.03% by mass.

Phosphorus (P) and S included in the inevitable impurities segregate in prior γ grain boundaries and promote temper embrittlement. It is desirable to limit the P and the S content of the weld metal of the present invention to values below 0.012% by mass, more desirably, below 0.010% by mass.

To form carbides that dominate temper embrittlement resistance properly, it is preferable that the value of a parameter CP expressed by Expression (1) be between 5 and 50 to promote the growth of MC carbides containing Nb as a principal component and to suppress the growth of carbides containing Cr as a principal component. The parameter CP of 5 or above is sufficient to suppress the growth of fine carbides (MC) and coarse carbides ($M_{23}C_6$). Coarse $M_{23}C_6$ increases if the parameter CP is below 5. It is possible that fine MC increases and, consequently, temper embrittlement resistance deteriorates when the parameter CP exceeds 50. Preferably, the lower limit of the parameter CP be 10, more desirably, 12. Preferably, the upper limit of the parameter CP be 40, more desirably, 30.

$$CP=[C]\times[Nb]/([Cr]/52+[Mo]/96+[Nb]/93+[V]/51)\times 1000 \qquad (1)$$

where [C], [Nb], [Cr], [Mo] and [V] are the C, the Nb, the Cr, the Mo and the V content in percentage by mass of the weld metal.

In the weld metal of the present invention, a residual extracted by electrolytic extraction from only an unaffected zone of the weld metal contains 0.3% by mass or below Cr and 0.005% by mass or above Nb. Satisfactory temper embrittlement resistance can be ensured by limiting the Cr content of the residual to a value below 0.3% by mass to reduce the coarse carbides ($M_{23}C_6$ and/or $M_7C_3$) containing Cr as a principal component. Satisfactory temper embrittlement resistance of the weld metal can be ensured by making the extracted residual have a Nb content not lower than 0.0056% by mass to promote the growth of fine carbides (MC) containing Nb as a principal component.

The electrolytic extraction uses a methanol solution containing 10% by volume acetylacetone and 1% by volume tetramethyammonium chloride as an electrolyte, applies 0 mV to a saturated calomel electrode, supplies about 1000 C of electricity at a room temperature to dissolve about 2 g of a sample sampled from the weld metal, and filters the electrolyte by using a filter having meshes of 0.1 μm after electrolysis. A residual remaining after filtration is subjected to ICP emission spectroscopic analysis and the respective amounts of precipitated Cr and Nb are measured.

In the weld metal of the present invention, the number density of oxide inclusions of a diameter of 1 μm or above in an observation area should be 2000 inclusions/mm$^2$. The observation area is a section of the weld metal in an optional plane. Fracture starting points can be reduced, and the weld metal has satisfactory temper embrittlement resistance and stable temper embrittlement resistance when the number density of oxide inclusions of 1 μm or above in diameter in an observation area is below 2000/mm$^2$. Stable temper embrittlement resistance ensures the minimum vE-50 of 55 J or above.

Preferably, the Si content [Si], the Mn content [Mn] and the O content [O] of the weld metal of the present invention meet a condition expressed by Expression (2).

$$12000[Si]+170[Mn]+150000[O]<9800 \qquad (2)$$

When the Si content [Si], the Mn content [Mn] and the O content [O] of the weld metal of the present invention meet the condition expressed by Expression (2), the oxidizing element content is controlled in addition to the oxygen content of the weld metal, the Si, the Mn and O content of the weld metal can be properly balanced, the number density of coarse oxide inclusions can be controlled, the temper embrittlement resistance can be improved, and desired stable temper embrittlement resistance can be ensured.

Although the structure of the weld metal of the high-strength Cr—Mo steel is not elucidated, it is inferred that the weld metal has the following structure.

The amount of oxygen contained in the weld metal and the size of the oxide inclusions dominate the number density of the oxide inclusions in the weld metal. Since the weld metal needs to contain a certain amount of oxygen, the number density can be reduced by forming the oxide inclusions in comparatively large inclusions. It is known that the size of oxide inclusions is dependent on the melting point or surface energy of the oxide inclusions. In the present invention, deoxidizing elements in the oxide inclusions are Si and Mn. Thus it is inferred that the size of the oxide inclusions can be controlled by controlling the oxide components by the balance of Si, Mn and O, and the number density can be controlled while the amount of oxygen is fixed substantially.

A shielded metal arc welding method for forming the weld metal of the present invention will be described.

The shielded metal arc welding method uses a covered electrode formed by coating a core wire with a mixture of a binder, and a coating flux containing C, Si, Mn, Cr, Mo, Nb, V, B, O, and the balance of Fe and inevitable impurities, an arc stabilizer, and a slag forming agent to form the weld metal containing C, Si, Mn, Cr, Mo, Nb, V, B and O as essential components respectively in predetermined contents, and the balance of Fe and inevitable impurities. A preferable welding current is between 140 and 190 A.

Conditions on the composition of the covered electrode and coating ratio will be described. Those components may be contained in either or both of the core wire and the coating flux. Each of the component contents is the sum of the component contents of the core wire and the coating flux when the component is contained in both the core wire and the coating flux.

C Content of the Covered Electrode

Carbon (C) is an important element for ensuring strength at room and high temperatures, and toughness. Yield needs to be taken into consideration in determining the C content of the covered electrode to form the weld metal having a C content between 0.04 and 0.10% by mass. Preferably, the C content of the covered electrode is between 0.04 and 0.12% by mass, more desirably, between 0.05 and 0.11% by mass.

Si Content of the Covered Electrode

Silicon (Si) improves the conformability of weld beads. Yield needs to be taken into consideration in determining the Si content of the covered electrode to form the weld metal having a Si content between 0.15 and 0.5% by mass. Preferably, the Si content of the covered electrode is between 1.0 and 1.8% by mass, more desirably, between 1.4 and 1.7% by mass.

Mn Content of the Covered Electrode

Manganese (Mn) is effective particularly in improving the toughness of a weld metal containing V. Yield needs to be taken into consideration in determining the Mn content of the covered electrode to form the weld metal having a Mn content between 0.5 and 1.0% by mass. Preferably, the Mn content of the covered electrode is between 0.8 and 1.8% by mass, more desirably, between 1.0 and 1.5% by mass.

Cr Content of the Covered Electrode

Chromium (Cr) is a principal component of a high-strength Cr—Mo steel excellent in heat resistance and is an important element to ensure the weld metal sufficient mechanical strength. Yield needs to be taken into consideration in determining the Cr content of the covered electrode to form the weld metal having a Cr content between 2.00 and 3.25% by mass. Preferably, the Cr content of the covered electrode is between 2.0 and 3.3% by mass, more desirably, between 2.2 and 3.0% by mass.

Mo Content of the Covered Electrode

Mo, as well as Cr, is a principal component of a high-strength Cr—Mo steel excellent in heat resistance and is an important element for ensuring the weld metal sufficient mechanical strength. Yield needs to be taken into consideration in determining the Mo content of the covered electrode to form the weld metal having a Mo content between 0.9 and 1.2% by mass. Preferably, the Mo content of the covered electrode is between 0.9 and 1.2% by mass, more desirably, between 1.0 and 1.1% by mass.

Nb Content of the Covered Electrode

Niobium (Nb) is effective in improving strength at room and high temperatures, and creep strength even if the Nb content is very low. Yield needs to be taken into consideration in determining the Nb content of the covered electrode to form the weld metal having a Mo content between 0.01 to 0.03% by mass. Preferably, the Nb content of the covered electrode is between 0.04 and 0.08% by mass, more desirably, between 0.05 and 0.07% by mass.

V Content of the Covered Electrode

Vanadium (V) makes fine MC carbides precipitate preferentially in grains of the weld metal after a SR process and improves the toughness and temper embrittlement resistance of the weld metal. Yield needs to be taken into consideration in determining the V content of the covered electrode to form the weld metal having a V content between 0.2 and 0.7% by mass. Preferably, the V content of the covered electrode is between 0.3 and 1.0% by mass, more desirably, between 0.4 and 0.8% by mass.

B Content of the Covered Electrode

Boron (B) is effective in ensuring the weld metal toughness. Amount of carbides containing Cr as a principal component is reduced when the weld metal has a proper B content. Yield needs to be taken into consideration in determining the B content of the covered electrode to form the weld metal having a B content not higher than 0.003% by mass. Preferably, the B content of the covered electrode is between 0.0002 and 0.005% by mass, more desirably, between 0.0002 and 0.004% by mass.

Cu and Ni Contents of the Covered Electrode

Although Cu and Ni are effective in ensuring the weld metal toughness, Cu and Ni deteriorate the temper embrittlement resistance of the weld metal. Therefore, it is preferable that the Cu and the Ni content of the weld metal be below 0.05% by mass. Thus, it is preferable that the Cu and the Ni content of the covered electrode be below 0.05% by mass, more desirably, below 0.03% by mass.

P Content of the Covered Electrode

Phosphorus (P) and S included in the inevitable impurities segregate in prior γ grain boundaries and promote temper embrittlement. It is desirable to limit the P and the S content of the weld metal to values below 0.012% by mass. Preferably, the P and the S content of the covered electrode is below 0.01% by mass, more desirably, below 0.010% by mass.

A metal carbonate, such as lime, a metal fluoride, such as fluorite, an oxide, such as alumina or rutile, Mg, iron powder, and an alkali may be added as the arc stabilizer and the slag forming agent to the coating flux as the occasion demands.

Sodium silicate or water glass containing potassium silicate may be used as the binder.

The coating flux content of the covered electrode is between 25 and 40% by mass, preferably, between 28 and 35% by mass. An electric arc cannot be concentrated, active spattering occurs, and welding work is very difficult when the coating flux content is below 25% by mass because a gas produced through the decomposition of the coating flux cannot form a satisfactory cup of coating. Moreover, slag cannot be sufficiently formed and beads cannot be formed in a satisfactory shape. A very large amount of slag is formed, and the movement of the covered electrode in a groove is difficult when the coating flux content exceeds 40% by mass. Moreover, slag inclusion occurs, slag removal is difficult, and welding work is very difficult.

EXAMPLES

Weld metals in examples of the present invention and those in comparative examples will be comparatively described.

Examples 1 to 9 and Comparative Examples 1 to 8

Core wires of 4.0 mm in diameter were coated with coating fluxes, respectively, to form semifinished covered electrodes. The semifinished covered electrodes were dried and baked to obtain covered electrodes respectively having compositions shown in Table 1.

Each of specimens was obtained by forming a V-groove 3 between 19 mm thick base metal plates 1a and 1b of a high-strength Cr—Mo steel, attaching a backing strip covering the bottom of the groove 3 with a backing strip 2 of the same composition as the base metal plates 1a and 1b to the base metal plates 1a and 1b so as to close the open bottom of the V-groove 3, and welding together the base metal plates 1a and 1b by butt welding. The groove angle of each of the V-grooves 3 was 10°. The width of the bottom of each of the V-grooves was 22 mm.

An eight-layer weld metal was formed by sixteen welding passes using a welding current of 170 A and a welding voltage of 25 V. Preheating-pass temperature was between 200° C. and 250° C.

TABLE 2

Chemical Composition of the Base Metal

| C | Si | Mn | P | S | Cr | Mo | Nb | V |
|---|---|---|---|---|---|---|---|---|
| 0.10 | 0.10 | 0.60 | 0.005 | 0.003 | 2.30 | 1.00 | 0.02 | 0.30 |

Figure 2:
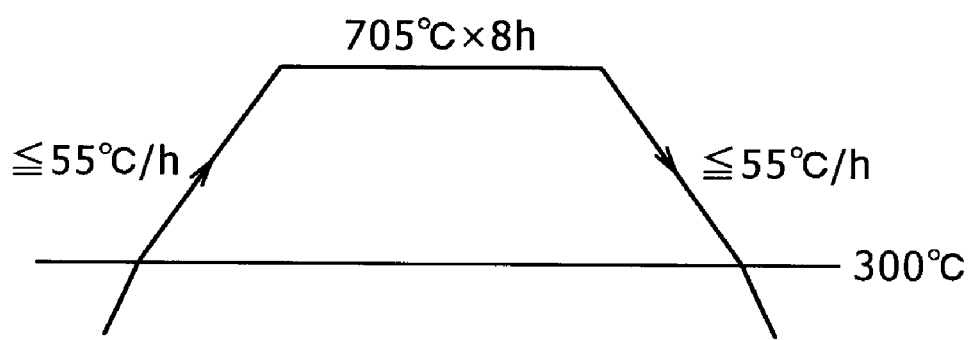
FIG. 2 is a diagram of assistance in explaining a SR treatment by which examples of the present invention and comparative examples were treated.

The specimens were subjected to a stress-relief annealing process (SR process). The stress-relief annealing process heated the specimen in a heating pattern shown in FIG. 2, in which temperature is measured on the vertical axis, and time is measured on the horizontal axis. The stress-relief annealing process heated the specimen to 705° C. at a heating rate of 55° C./hr after the temperature of the specimen had exceeded 300° C. Then, the specimen was held at 705° C. for 8 hr, and then specimen was cooled to 300° C. or below at a cooling rate of 55° C./hr. Any heating and cooling conditions were not specified when the temperature of the specimen was in a temperature range not higher than 300° C.

Figure 3:
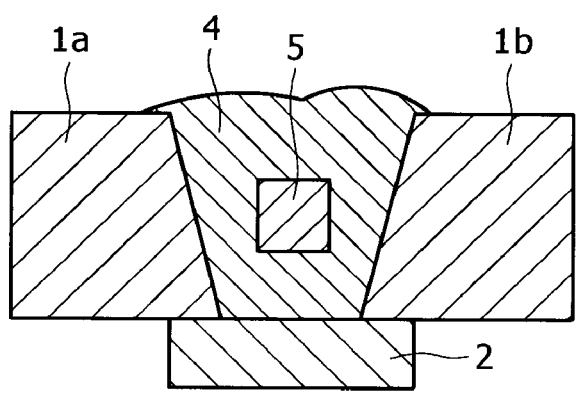
FIG. 3 is a sectional view of assistance in explaining a sampling method of sampling a sample from weld metals in examples of the present invention and comparative examples.

A sample weld metal 5 of a size specified in Z3111-4 JIS was cut out from a middle part of a weld metal 4 formed in the V-groove of the specimen processed by the SR process as shown in FIG. 3. The chemical composition of the sample weld metal was analyzed by an absorptometric method for B, a combustion-infrared absorptometric method for C and S, an inert gas fusion thermal conductivity method for N and O, and an inductively coupled plasma atomic emission spectrometric method for elements other than B, C, S, N, and O. The number of oxide inclusions in an observation area of 1 mm$^2$ was counted by the following method.

Number of Oxide Inclusions

The sample weld metal was cut out from the weld metal of the specimen. The sample weld metal was observed under a scanning electron microscope (SUPRA 35, Carl Zeiss) at a 100× magnification. Images of twenty observation areas of 0.006 mm$^2$ were photographed. The images were analyzed by a method using image analyzing software (Image-Pro Plus, Media Cybernetic). Diameters of oxide inclusions were cal-

TABLE 1

Chemical Composition of Covered Electrodes

| | | C | Si | Mn | P | S | Cu | Ni | Cr | Mo | Ti | Nb | V | O | B |
|---|---|---|---|---|---|---|---|---|---|---|---|---|---|---|---|
| Example | 1 | 0.09 | 1.53 | 1.18 | 0.007 | 0.010 | 0.02 | 0.02 | 2.6 | 1.02 | 0.001 | 0.047 | 0.40 | 0.002 | 0.0002 |
| | 2 | 0.09 | 1.53 | 1.18 | 0.007 | 0.010 | 0.02 | 0.02 | 2.6 | 1.02 | 0.001 | 0.047 | 0.40 | 0.002 | 0.0002 |
| | 3 | 0.11 | 1.43 | 1.21 | 0.009 | 0.006 | 0.02 | 0.02 | 2.6 | 1.03 | 0.001 | 0.073 | 0.41 | 0.002 | 0.0023 |
| | 4 | 0.09 | 1.54 | 1.20 | 0.007 | 0.009 | 0.02 | 0.02 | 2.6 | 0.99 | 0.001 | 0.071 | 0.42 | 0.002 | 0.0024 |
| | 5 | 0.07 | 1.78 | 0.81 | 0.009 | 0.006 | 0.02 | 0.02 | 2.6 | 1.03 | 0.001 | 0.043 | 0.33 | 0.002 | 0.0019 |
| | 6 | 0.04 | 1.43 | 1.21 | 0.009 | 0.009 | 0.02 | 0.06 | 2.6 | 1.03 | 0.002 | 0.073 | 0.41 | 0.016 | 0.0023 |
| | 7 | 0.04 | 1.43 | 1.21 | 0.009 | 0.009 | 0.02 | 0.06 | 2.6 | 1.03 | 0.002 | 0.073 | 0.41 | 0.016 | 0.0045 |
| | 8 | 0.08 | 1.43 | 1.21 | 0.008 | 0.006 | 0.02 | 0.02 | 2.6 | 1.03 | 0.001 | 0.073 | 0.41 | 0.002 | 0.0023 |
| | 9 | 0.08 | 1.73 | 0.95 | 0.008 | 0.007 | 0.03 | 0.04 | 2.5 | 0.99 | 0.004 | 0.054 | 0.39 | 0.002 | 0.0023 |
| Comparative example | 1 | 0.16 | 1.36 | 1.31 | 0.005 | 0.003 | 0.01 | 0.02 | 1.7 | 0.73 | 0.002 | 0.046 | 0.19 | 0.002 | 0.0002 |
| | 2 | 0.04 | 1.78 | 0.81 | 0.010 | 0.009 | 0.02 | 0.06 | 2.6 | 1.03 | 0.002 | 0.043 | 0.33 | 0.016 | 0.0019 |
| | 3 | 0.09 | 1.73 | 1.90 | 0.007 | 0.010 | 0.02 | 0.02 | 2.6 | 1.01 | 0.001 | 0.049 | 0.42 | 0.002 | 0.0026 |
| | 4 | 0.09 | 1.37 | 1.09 | 0.007 | 0.010 | 0.02 | 0.02 | 2.6 | 1.02 | 0.001 | 0.048 | 0.41 | 0.002 | |
| | 5 | 0.09 | 1.54 | 1.20 | 0.007 | 0.009 | 0.02 | 0.02 | 2.6 | 0.99 | 0.001 | 0.147 | 0.42 | 0.002 | 0.0024 |
| | 6 | 0.08 | 1.09 | 1.55 | 0.007 | 0.007 | 0.03 | 0.04 | 2.7 | 0.99 | 0.004 | 0.090 | 0.50 | 0.002 | |
| | 7 | 0.04 | 1.43 | 1.21 | 0.009 | 0.009 | 0.02 | 0.06 | 2.6 | 1.03 | 0.002 | 0.073 | 0.41 | 0.016 | |
| | 8 | 0.09 | 1.52 | 1.17 | 0.007 | 0.010 | 0.02 | 0.02 | 2.6 | 1.02 | 0.001 | 0.047 | 0.40 | 0.002 | 0.0068 | culated, and the number density of oxide inclusions of sizes not smaller than 1 μm was calculated.

The specimen was subjected to a Charpy impact test according to Z3111-4, JIS to measure vTr55.

Figure 4:
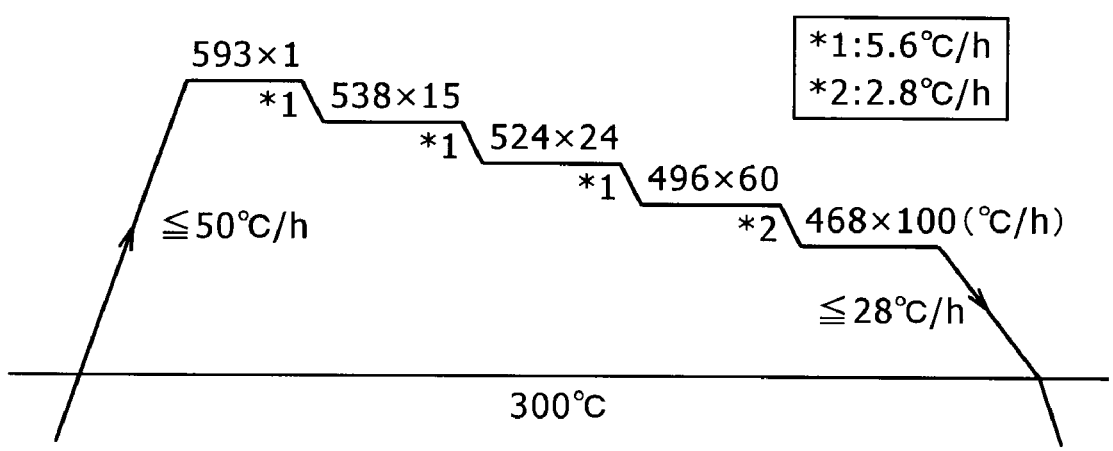
FIG. 4 is a diagram of assistance in explaining a step cooling process to which examples of the present invention and comparative examples were subjected.

The specimen was subjected to an embrittlement promotion process (step cooling process) to evaluate the temper embrittlement resistance of the specimen by vTr'55. FIG. 4 is a diagram of assistance in explaining the step cooling process. The step cooling process will be described with reference to FIG. 4. The specimen was heated up to 593° C. at a heating rate not higher than 50° C./hr after the temperature of the specimen had exceeded 300° C., and the specimen was kept at 593° C. for 1 hr. Then, the specimen was kept sequentially at 538° C. for 15 hr, at 524° C. for 24 hr, and at 496° C. for 60 hr. Thus the specimen was cooled at a cooling rate of 5.6° C./hr. The specimen kept at 496° C. for 24 hr is cooled down to 468° C. at a cooling rate of 2.8° C./hr and was kept at 468° C. for 100 hr. Then, the specimen is cooled down to a temperature not higher than 300° C. at a cooling rate of 28° C./hr. Similarly to the condition for the SR process, any conditions were not imposed on heating and cooling.

The specimen cooled by the step cooling process was subjected to a Charpy impact test according to Z 3111-4, JIS to measure vTr'55 and vE-50.

The specimen processed by the step cooling process was subjected to an electrolytic extraction process under conditions shown in Table 3. A residual obtained by electrolytic extraction was subjected to ICP emission spectroscopic analysis and the respective amounts of precipitated Cr and Nb were measured.

TABLE 3

|  | Conditions for Electrolytic Extraction |
|---|---|
| Electrolyte | Methanol solution containing 10% by vol. acetylacetone and 1% by vol. tetramethylammonium chloride |
| Conditions for electrolysis | Application of 0 mV to saturated calomel electrode |
| Temperature | Room temperature |
| Quantity of electricity | About 1000 C |
| Weight of sample | About 2 g |
| Mesh of the filter | 0.22 μm |

Shown in Tables 4-1, 4-2 and 4-3 are the compositions of the samples of the weld metals, calculated parameters CP, results of analysis of residuals obtained by electrolytic extraction, the balance of Si, Mn and O (values of the left side of Expression (2)), values of vTr55, namely, the index of toughness, values of Δ=vTr55-vTr'55, namely, the index of temper embrittlement resistance, and values of vE-55 after the step cooling process. Specimens meeting vTr55<-50° C., vTr'55<-−50° C., and Δ=vTr55-vTr'55<5° C. are granted to be acceptable. All the negative values of Δ are represented by 0, which indicates that the weld metal is excellent and is hardly embrittled. Specimens having the average vE-55 of 55 J or above of three measured values and the minimum vE-55 of 47 J or above are granted to be acceptable.

TABLE 4-1

Chemical composition and mechanical properties of weld metals

|  |  | C | Si | Mn | P | S | Cu | Ni | Cr | Mo | Ti | Nb | V | O | B | Sn | Sb | As |
|---|---|---|---|---|---|---|---|---|---|---|---|---|---|---|---|---|---|---|
| Example | 1 | 0.08 | 0.22 | 0.71 | 0.005 | 0.004 | 0.02 | 0.03 | 2.52 | 1.0 | 0.004 | 0.010 | 0.23 | 0.036 | 0.0001 | 0.002 | 0.002 | 0.003 |
|  | 2 | 0.07 | 0.22 | 0.76 | 0.005 | 0.003 | 0.03 | 0.03 | 2.52 | 1.0 | 0.004 | 0.012 | 0.28 | 0.034 | 0.0008 | 0.002 | 0.003 | 0.002 |
|  | 3 | 0.09 | 0.24 | 0.73 | 0.007 | 0.002 | 0.03 | 0.03 | 2.58 | 1.1 | 0.003 | 0.020 | 0.29 | 0.037 | 0.0003 | 0.003 | 0.002 | 0.003 |
|  | 4 | 0.08 | 0.25 | 0.79 | 0.005 | 0.003 | 0.03 | 0.03 | 2.51 | 1.0 | 0.003 | 0.022 | 0.32 | 0.032 | 0.0004 | 0.002 | 0.002 | 0.002 |
|  | 5 | 0.07 | 0.40 | 0.57 | 0.007 | 0.002 | 0.03 | 0.03 | 2.58 | 1.0 | 0.004 | 0.020 | 0.27 | 0.034 | 0.0002 | 0.002 | 0.003 | 0.003 |
|  | 6 | 0.06 | 0.23 | 0.72 | 0.008 | 0.004 | 0.03 | 0.06 | 2.58 | 1.1 | 0.003 | 0.020 | 0.27 | 0.045 | 0.0003 | 0.003 | 0.002 | 0.002 |
|  | 7 | 0.06 | 0.27 | 0.71 | 0.008 | 0.004 | 0.03 | 0.06 | 2.60 | 1.1 | 0.003 | 0.022 | 0.29 | 0.039 | 0.0014 | 0.002 | 0.002 | 0.003 |
|  | 8 | 0.08 | 0.27 | 0.76 | 0.007 | 0.002 | 0.03 | 0.03 | 2.63 | 1.1 | 0.004 | 0.024 | 0.31 | 0.036 | 0.0005 | 0.003 | 0.003 | 0.002 |
|  | 9 | 0.07 | 0.37 | 0.69 | 0.006 | 0.002 | 0.04 | 0.05 | 2.43 | 1.0 | 0.003 | 0.024 | 0.33 | 0.029 | 0.0007 | 0.003 | 0.002 | 0.002 |
| Comparative example | 1 | 0.15 | 0.37 | 1.00 | 0.004 | 0.003 | 0.01 | 0.02 | 2.24 | 1.0 | 0.002 | 0.035 | 0.23 | 0.030 | 0.0002 | 0.002 | 0.002 | 0.003 |
|  | 2 | 0.06 | 0.58 | 0.55 | 0.009 | 0.004 | 0.03 | 0.06 | 2.60 | 1.1 | 0.004 | 0.023 | 0.29 | 0.034 | 0.0004 | 0.002 | 0.002 | 0.003 |
|  | 3 | 0.09 | 0.28 | 1.08 | 0.005 | 0.003 | 0.03 | 0.03 | 2.49 | 1.0 | 0.003 | 0.011 | 0.27 | 0.030 | 0.0004 | 0.003 | 0.002 | 0.002 |
|  | 4 | 0.08 | 0.17 | 0.62 | 0.005 | 0.003 | 1.00 | 0.03 | 2.48 | 1.0 | 0.002 | 0.003 | 0.22 | 0.043 | 0.0001 | 0.002 | 0.003 | 0.002 |
|  | 5 | 0.08 | 0.30 | 0.79 | 0.006 | 0.003 | 0.03 | 0.03 | 2.52 | 1.0 | 0.004 | 0.054 | 0.31 | 0.034 | 0.0006 | 0.003 | 0.002 | 0.002 |
|  | 6 | 0.07 | 0.10 | 0.87 | 0.005 | 0.003 | 0.04 | 0.05 | 2.64 | 1.0 | 0.003 | 0.011 | 0.23 | 0.061 | 0.0001 | 0.002 | 0.002 | 0.003 |
|  | 7 | 0.06 | 0.23 | 0.75 | 0.008 | 0.004 | 0.03 | 0.06 | 2.60 | 1.1 | 0.004 | 0.019 | 0.27 | 0.045 | 0.0000 | 0.003 | 0.003 | 0.002 |
|  | 8 | 0.08 | 0.28 | 0.76 | 0.005 | 0.003 | 0.02 | 0.03 | 2.53 | 1.0 | 0.004 | 0.015 | 0.29 | 0.033 | 0.0043 | 0.002 | 0.002 | 0.003 |

TABLE 5 (TABLE 4-2)

Chemical composition and mechanical properties of weld metals

|  |  |  | Electrolytic extraction | | | Density of oxide inclusions of 1 μm or above |
|---|---|---|---|---|---|---|
|  |  | Parameter CP | insol. Cr | insol. Nb | Si—Mn—O Balance | in size (inclusions/mm$^2$) |
| Example | 1 | 13.1 | 0.26 | 0.008 | 8161 | 945 |
|  | 2 | 12.6 | 0.17 | 0.010 | 7869 | 1194 |
|  | 3 | 25.8 | 0.22 | 0.018 | 8554 | 1275 |
|  | 4 | 25.3 | 0.16 | 0.022 | 7934 | 1036 |
|  | 5 | 19.7 | 0.20 | 0.018 | 9997 | 2064 |
|  | 6 | 19.3 | 0.25 | 0.015 | 9632 | 1822 |
|  | 7 | 19.7 | 0.18 | 0.016 | 9211 | 1563 |
|  | 8 | 27.1 | 0.20 | 0.020 | 8769 | 1472 |
|  | 9 | 27.7 | 0.15 | 0.020 | 8907 | 820 |

TABLE 5 (TABLE 4-2)-continued

Chemical composition and mechanical properties of weld metals

| | | Electrolytic extraction | | | | Density of oxide inclusions of 1 μm or above |
|---|---|---|---|---|---|---|
| | | Parameter CP | insol. Cr | insol. Nb | Si—Mn—O Balance | in size (inclusions/mm$^2$) |
| Comparative example | 1 | 89.7 | 0.35 | 0.015 | 9110 | 1235 |
| | 2 | 20.9 | 0.24 | 0.015 | 12154 | 2672 |
| | 3 | 14.6 | 0.25 | 0.011 | 8044 | 1031 |
| | 4 | 4.0 | 0.36 | 0.003 | 8595 | 1010 |
| | 5 | 68.8 | 0.28 | 0.025 | 8834 | 1569 |
| | 6 | 10.8 | 0.23 | 0.005 | 10498 | 2467 |
| | 7 | 15.7 | 0.32 | 0.004 | 9638 | 1855 |
| | 8 | 18.1 | 0.25 | 0.005 | 8439 | 1003 |

TABLE 6 (TABLE 4-3)

| | | vTr55 | vTr'55 | Δ | Values of vE-50 (J) after step cooling | | | | |
|---|---|---|---|---|---|---|---|---|---|
| | | °C. | °C. | °C. | 1 | 2 | 3 | ave. | min. |
| Passing value | | <−50 | <−50 | <5 | | | | >55 | >47 |
| Example | 1 | −53 | −55 | 0 | 84 | 66 | 71 | 74 | 66 |
| | 2 | −61 | −62 | 0 | 100 | 55 | 109 | 88 | 55 |
| | 3 | −67 | −62 | 5 | 60 | 74 | 95 | 76 | 60 |
| | 4 | −53 | −67 | 0 | 70 | 141 | 124 | 112 | 70 |
| | 5 | −54 | −62 | 0 | 98 | 120 | 42 | 87 | 42 |
| | 6 | −50 | −50 | 2 | 84 | 49 | 52 | 62 | 49 |
| | 7 | −51 | −57 | 0 | 74 | 76 | 62 | 71 | 62 |
| | 8 | −68 | −63 | 5 | 63 | 91 | 134 | 96 | 63 |
| | 9 | −70 | −90 | 0 | 79 | 122 | 82 | 94 | 79 |
| Comparative example | 1 | −58 | −42 | 16 | 43 | 38 | 45 | 42 | 38 |
| | 2 | −36 | −25 | 11 | 31 | 32 | 35 | 33 | 31 |
| | 3 | −66 | −54 | 12 | 60 | 74 | 108 | 81 | 60 |
| | 4 | −47 | −35 | 12 | 12 | 31 | 46 | 29 | 12 |
| | 5 | −21 | −32 | 0 | 46 | 22 | 14 | 27 | 14 |
| | 6 | −38 | −46 | 0 | 35 | 42 | 91 | 56 | 35 |
| | 7 | −51 | −35 | 16 | 51 | 78 | 19 | 49 | 19 |
| | 8 | −55 | −41 | 14 | 6 | 14 | 48 | 23 | 6 |

As obvious from Tables 4-1, 4-2 and 4-3, the weld metals in Examples 1 to 8 had values of the component contents, and the respective amounts of precipitated Cr (insoluble Cr) and precipitated Nb (insoluble Nb) within ranges specified by the present invention. The weld metals in Examples 1 to 9 had acceptable values of vTr55 and vE-50, which are the index of toughness, and Δ, which is the index of temper embrittlement resistance. The weld metals in Examples 1 to 8 had the minimum values of vE-50 of 55 J or above determined by Charpy impact test after step cooling. Those measured values proved that the weld metals in Examples 1 to 8 had stable temper embrittlement resistance.

The weld metal in Comparative example 1 had a C content above the upper limit of the C content range specified by the present invention, and had the parameter CP of 89.5 greater than 60. Therefore, the weld metal in Comparative example 1 had a high value of insol. Cr, and low temper embrittlement resistance. The weld metal in Comparative example 2 had a Si content above the upper limit of the Si content range specified by the present invention. Therefore the weld metal in Comparative example 2 is inferior in toughness and temper embrittlement resistance. The weld metal in Comparative example 3 had a Mn content above the upper limit of the Mn content range specified by the present invention. Although the weld metal in comparative example 3 was satisfactory in toughness, the same was inferior in temper embrittlement resistance.

The weld metal in Comparative example 4 had a Nb content below the lower limit of the Nb content range specified by the present invention, a value of the parameter PC of 4.0 smaller than 5, a high insol. Cr, and a low insol. Nb. Therefore, the weld metal in Comparative example 4 was inferior in temper embrittlement resistance and toughness. The weld metal in Comparative example 5 had a Nb content above the upper limit of the Nb content range specified by the present invention and a value of the PC parameter of 68.8 greater than 60. The weld metal in comparative example 5 had low toughness.

The weld metal in Comparative example 6 had an O content above the upper limit of the O content range specified by the present invention, and was inferior in toughness. The weld metal in Comparative example 7 did not contain B and was inferior in toughness. The weld metal in Comparative example 8 had a B content above the B content range specified by the present invention and a low insol. Nb. The weld metal in Comparative example 8 was inferior in temper embrittlement resistance.

FIG. 5 is a graph showing the dependence of the minimum value of vE-50 (vE-50 min.) on the number density of oxide inclusions of a diameter of 1 μm or above for weld metals in Examples 1 to 9, and those in Comparative examples 1 to 8.

As obvious from FIG. 5, the weld metals in Examples 1 to 4, and 6 to 9 having oxide inclusions densities below 2000 inclusions/mm$^2$ had the minimum values of vE-50 not smaller than 47 J, which proved that those weld metals had satisfactory, stable temper embrittlement resistance. The weld metals in Comparative examples 1, 3 to 5, 7, and 8 having oxide inclusions densities below 2000 inclusions/mm² had the minimum values of vE-50 not greater than 47 J, which proved that those weld metals did not have satisfactory, stable temper embrittlement resistance.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A weld metal of a high-strength Cr—Mo steel formed by shielded metal arc welding, which has a minimum vE-50 of 60 J or above in the Charpy impact test after an embrittlement promotion process, said weld metal containing: 0.04 to 0.10% by mass C, 0.15 to 0.5% by mass Si, 0.5 to 1.0% by mass Mn, 2.00 to 3.25% by mass Cr, 0.9 to 1.2% by mass Mo, 0.01 to 0.03% by mass Nb, 0.2 to 0.7% by mass V, 0.003% by mass or below and above 0% by mass B, 0.02 to 0.05% by mass O, 0.02 to 0.04% by mass Cu, 0.03 to 0.06% by mass Ni and the balance of Fe and inevitable impurities;

wherein the inevitable impurities contain P and S in a P content below 0.012% by mass, and a S content below 0.012% by mass, respectively, wherein the weld metal has a parameter CP of 13.1 to 27.7 expressed by:

$$CP=[C]\times[Nb]/([Cr]/52+[Mo]/96+[Nb]/93+[V]/51)\times 1000 \quad (1)$$

wherein [C], [Nb], [Cr], [Mo] and [V] are the C, the Nb, the Cr, the Mo and the V content in percentage by mass of the weld metal, and wherein a residual extracted by electrolytic extraction from only an unaffected zone of the weld metal contains precipitated Cr in a Cr content below 0.3% by mass, and precipitated Nb in a Nb content of 0.005% by mass or above wherein the number of oxide inclusions of 1 μm or above in size in an observation area of 1 mm² is below 2000, wherein the weld metal has a Si content [Si], a Mn content [Mn} and an Q content [Q] meeting a condition expressed by Expression (2), $$7934<12000[SI]+170[Mn]+150000[O]<9211 \quad (2).$$

2. The weld metal of a high-strength Cr—Mo steel according to claim 1, which contains between 0.05 and 0.08% by mass of C.

3. The weld metal of a high-strength Cr—Mo steel according to claim 1, which contains between 0.2 and 0.4% by mass of Si.

4. The weld metal of a high-strength Cr—Mo steel according to claim 1, which contains between 2.1 and 3.0% by mass of Cr.

5. The weld metal of a high-strength Cr—Mo steel according to claim 1, which contains between 1.0 and 1.1% by mass of Mo.

6. The weld metal of a high-strength Cr—Mo steel according to claim 1, which contains between 0.015 and 0.025% by mass of Nb.

7. The weld metal of a high-strength Cr—Mo steel according to claim 1, which contains between 0.3 and 0.6% by mass of V.

8. The weld metal of a high-strength Cr—Mo steel according to claim 1, which contains up to 0.002% by mass of B.

9. The weld metal of a high-strength Cr—Mo steel according to claim 1, which contains between 0.03 and 0.04% by mass of O.

* * * * *